US009992629B2

(12) United States Patent
Singh et al.

(10) Patent No.: US 9,992,629 B2
(45) Date of Patent: *Jun. 5, 2018

(54) SYSTEM AND METHOD FOR PROVIDING A DESCRIPTOR FOR A LOCATION TO A RECIPIENT

(71) Applicant: Scenera Mobile Technologies, LLC, Peterborough, NH (US)

(72) Inventors: Munindar P. Singh, Cary, NC (US); Mona Singh, Cary, NC (US)

(73) Assignee: SCENERA MOBILE TECHNOLOGIES, LLC, Portsmouth, NH (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/396,746

(22) Filed: Jan. 2, 2017

(65) Prior Publication Data

US 2017/0180943 A1    Jun. 22, 2017

Related U.S. Application Data

(63) Continuation of application No. 14/733,120, filed on Jun. 8, 2015, now Pat. No. 9,538,324, which is a continuation of application No. 14/284,682, filed on May 22, 2014, now Pat. No. 9,055,109, which is a continuation of application No. 13/325,615, filed on Dec. 14, 2011, now Pat. No. 8,737,969, which is a continuation of application No. 11/425,650, filed on Jun. 21, 2006, now Pat. No. 8,099,086.

(51) Int. Cl.
*H04M 3/42*    (2006.01)
*H04W 4/02*    (2018.01)
*H04W 64/00*   (2009.01)

(52) U.S. Cl.
CPC ........... *H04W 4/028* (2013.01); *H04W 64/00* (2013.01)

(58) Field of Classification Search
CPC ......... H04L 12/5895; H04L 29/08657; H04W 64/00; H04W 4/02; G06F 17/3087; G06N 5/04; H04N 19/463; H04N 19/44; H04N 19/91
USPC ............ 455/414, 457, 404.2, 456.3; 715/700
See application file for complete search history.

(56) References Cited

U.S. PATENT DOCUMENTS

| | | |
|---|---|---|
| 5,493,677 A | 2/1996 | Balogh et al. |
| 6,275,707 B1 | 8/2001 | Reed et al. |
| 6,374,179 B1 | 4/2002 | Smith et al. |
| 6,411,724 B1 | 6/2002 | Valthilingam et al. |
| 6,629,104 B1 | 9/2003 | Parulski et al. |
| 6,668,173 B2 | 12/2003 | Greene |
| 6,714,791 B2 | 3/2004 | Friedman |
| 6,804,684 B2 | 10/2004 | Stubler et al. |
| 6,831,598 B2 | 12/2004 | Saint-Hilaire et al. |
| 6,850,188 B1 | 2/2005 | Lee et al. |
| 6,885,874 B2 | 4/2005 | Grube et al. |

(Continued)

*Primary Examiner* — Phuoc H Doan

(57) ABSTRACT

A method for providing a descriptor of a location to a recipient includes receiving location data of the location from a user and using the location data to identify one or more regions near or including the location. Each region is associated with a descriptor. One of the one or more regions is selected based on a recipient's interaction with the selected region including whether the user has shared with or received from the recipient the descriptor associated with the selected region. The descriptor associated with the selected region is provided to the recipient.

19 Claims, 8 Drawing Sheets

(56) References Cited

U.S. PATENT DOCUMENTS

| | | |
|---|---|---|
| 6,920,328 B2 | 7/2005 | Wollrab |
| 6,952,181 B2 | 10/2005 | Karr et al. |
| 6,975,941 B1 | 12/2005 | Lau et al. |
| 6,999,777 B1 | 2/2006 | Ganesh |
| 7,155,456 B2 | 12/2006 | Abbott, III et al. |
| 7,283,827 B2 | 10/2007 | Meadows et al. |
| 7,353,034 B2 | 4/2008 | Haney |
| 7,395,507 B2 | 7/2008 | Robarts et al. |
| 7,512,889 B2 | 3/2009 | Newell et al. |
| 7,533,082 B2 | 5/2009 | Abbott et al. |
| 7,614,001 B2 | 11/2009 | Abbott et al. |
| 2002/0057283 A1* | 5/2002 | Biswas ............... G06F 17/3087 715/700 |
| 2004/0027624 A1 | 2/2004 | Parulski et al. |
| 2004/0133605 A1 | 7/2004 | Chang et al. |
| 2004/0174434 A1 | 9/2004 | Walker et al. |
| 2004/0194025 A1 | 9/2004 | Hubert et al. |
| 2004/0205482 A1 | 10/2004 | Basu et al. |
| 2004/0248591 A1 | 12/2004 | Fish |
| 2005/0050043 A1 | 3/2005 | Pyhalammi et al. |
| 2005/0091276 A1 | 4/2005 | Brunswig et al. |
| 2005/0192030 A1 | 9/2005 | Asthana et al. |
| 2005/0234922 A1 | 10/2005 | Parekh et al. |
| 2005/0288036 A1 | 12/2005 | Brewer et al. |
| 2006/0015925 A1 | 1/2006 | Logan |
| 2007/0032268 A1 | 2/2007 | Gotfried |
| 2007/0067098 A1 | 3/2007 | Zelentsov |
| 2007/0288164 A1 | 12/2007 | Gordon et al. |
| 2007/0298812 A1 | 12/2007 | Singh |
| 2007/0298813 A1 | 12/2007 | Singh |
| 2008/0139244 A1 | 6/2008 | Vau et al. |
| 2008/0227473 A1 | 9/2008 | Haney |

\* cited by examiner

SYSTEM AND METHOD FOR PROVIDING A DESCRIPTOR FOR A LOCATION TO A RECIPIENT

CROSS-REFERENCE TO RELATED APPLICATION

The present invention is a continuation of U.S. patent application Ser. No. 14/733,120 (now U.S. Pat. No. 9,538,324), filed Jan. 8, 2015, which is a continuation of U.S. patent application Ser. No. 14/284,682 (now U.S. Pat. No. 9,055,109), filed May 22, 2014, which is a continuation of U.S. patent application Ser. No. 13/325,615 (now U.S. Pat. No. 8,737,969), filed Dec. 14, 2011, which is a continuation of U.S. patent application Ser. No. 11/425,650 (now U.S. Pat. No. 8,099,086), filed Jun. 21, 2006, all of which are hereby incorporated by reference. This application is also related to U.S. patent application Ser. No. 11/425,623 entitled "System and Method for Naming a Location Based on User-Specific Information," filed Jun. 21, 2006, and assigned to the assignee of the present application and herein incorporated by reference.

BACKGROUND

Handheld electronic devices, such as personal digital assistants (PDAs), mobile phones, digital cameras, and the like, offer mobility and a variety of services to their respective users. They are typically configured to transmit and receive data to and from other devices via a wired or wireless connection. Most mobile phones, for example, can provide Internet access, maintain a personal address book, provide messaging capabilities, capture digital images, as well as place phone calls.

Many devices, in particular mobile phones, can identify their respective locations within a certain range depending on the device and location identifying technique. Some devices can use sophisticated position determining systems, such as a Global Positioning System (GPS). The GPS is a satellite-based radio navigation system that uses signals from three or four satellites to compute the current latitude, longitude and elevation of a GPS receiver in the device anywhere on earth down to within a few meters. Other devices can use a location identifying technique based on which base station is servicing the device, that is, the location of the device is within a range of the base station from which a call is made. Other devices can use location identifying techniques based on triangulation between the device and at least two base stations.

The device's location, typically represented by geospatial coordinates, can be used in a variety of ways. It can be used to describe a digital image captured at the location and it can then be stored as metadata for categorizing the image. The location can also be used to link other information with the location, such as a favorite restaurant or bookstore. The location can also be used to inform other users where to meet.

As stated above, the location is typically represented by geospatial coordinates. Geographical information systems (GISs) exist that correlate geospatial coordinates with geographical data such as street address, location name and other information. Accordingly, the geographical data corresponding to the geospatial coordinates can be displayed to the user and/or utilized by an application in the device, e.g., to associate a location's name with an image.

While providing the geographical data of a location can be helpful, e.g., to orient a user or to categorize a set of images, the geographical data itself can hold little or no relevance to the user. For example, if the user has forgotten the name of a particular business, the address of the business is not particularly useful.

In a co-pending patent application entitled, System and Method for Naming a Location Based on User-Specific Information (Ser. No. 11/425,623), filed Jun. 21, 2006 and assigned to the assignee of the present invention, a name generation module automatically provides a name of a location based on an atemporal correlation between general information and user-specific information relating to the location. Because the name for the location is based on user-specific information, the name can be meaningful to the user. The user is not required to think of and to enter a name for each location, which can be tedious when several locations need to be named and when the most appropriate name might not be readily apparent to the user.

As stated above, the name for the location can be used for a variety of purposes including identifying the location for a meeting with another user. For example, the user can send a message to a friend telling him that the user is at "work," or at the "gym." While the names "work" and "gym" can be meaningful to the user, such user-specific names may not be meaningful to the friend. Moreover, the user-specific name for a location may be highly personal or classified, and sharing it with the friend might be inappropriate. Thus, the user would be required to enter another descriptor for the location, which may or may not be familiar to the friend.

SUMMARY

Accordingly, a system and method for providing a descriptor of a location to a recipient are described. According to one exemplary embodiment, a method includes receiving location data of the location from a user and using the location data to identify a plurality of regions near or including the location. Each region is associated with a descriptor. The recipient's level of familiarity with each of the regions is determined and at least one region is selected based on the recipient's level of familiarity with the selected region. Once the at least one region is selected, for each of the at least one selected region, the descriptor associated with the selected region is provided to the recipient via the user.

According to another exemplary embodiment, a system for providing a descriptor of a location to a recipient includes a data store for storing region information correlated with location data and recipient data relating to the region information. The region information includes a user-specified descriptor associated with each of a plurality of regions. The system also includes a descriptor sharing module coupled to the data store. The descriptor sharing module is configured to receive a request from a user to provide a descriptor for a location, which includes location data of the location. The descriptor sharing module uses the location data of the location to identify a plurality of regions near or including the location based on the region information, determines a level of familiarity of the recipient with each identified region based on the recipient data, selects at least one region based on the recipient's level of familiarity with the selected region, and provides, for each of the at least one selected region, the descriptor associated with the selected region to the recipient via the user.

According to another embodiment, an electronic communication device includes a communication interface coupled to a network, and a data store for storing region information correlated with location data and recipient data relating to the region information. The region information includes a user-specified descriptor associated with each of a plurality of regions. The device also includes a descriptor sharing module configured to receive location data of a location. The descriptor sharing module uses the location data of the location to identify a plurality of regions near or including the location based on the region information, determines a level of familiarity of the recipient with each identified region based on the recipient data, selects at least one region based on the recipient's level of familiarity with the selected region, and provides, for each of the at least one selected region, the descriptor associated with the selected region to the recipient over the network via the communication interface.

According to another exemplary embodiment, a server comprises a communication interface for communicating with an electronic communication device associated with a user over a network and for communication with a data store that stores region information correlated with location data and recipient data relating to the region information. The region information includes a user-specified descriptor associated with each of a plurality of regions. The server also comprises a descriptor sharing module configured to receive location data of a location and a recipient identifier from the electronic communication device, to identify a plurality of regions near or including the location based on the region information, to determine a level of familiarity of the recipient with each identified region based on the recipient data, to select at least one region based on the recipient's level of familiarity with the selected region, and to provide, for each of the at least one selected region, the descriptor associated with the selected region to the mobile communication device over the network via the communication interface.

BRIEF DESCRIPTION OF THE DRAWINGS

The accompanying drawings provide visual representations which will be used to more fully describe the representative embodiments disclosed here and can be used by those skilled in the art to better understand the representative embodiments and their inherent advantages. In these drawings, like reference numerals identify corresponding elements, and.

DETAILED DESCRIPTION

Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

According to an exemplary embodiment, geographical regions defined by geospatial coordinates are associated with descriptors. In one embodiment, a user can specify the descriptor for each of a plurality of regions and such region information can be stored in a data store. The data store can also include recipient data for the user's contacts, which is related to the region information. When the user wishes to share a descriptor for a location with a recipient, the geospatial coordinates associated with the location are used to identify a plurality of regions at or near the location. The recipient data is then used to determine a level of familiarity of the recipient with the identified regions. Based on the recipient's level of familiarity, at least one of the identified regions is selected and the descriptors associated with the selected regions are provided to the recipient.

The selected descriptors are, by their nature, relevant to the user because they are based on information specific to the user. In addition, the descriptors can be familiar to the recipient because their selection is based on the recipient's level of familiarity with the associated regions. The descriptors are determined automatically and presented to the user so that the user only needs to select a descriptor to share.

Figure 1:
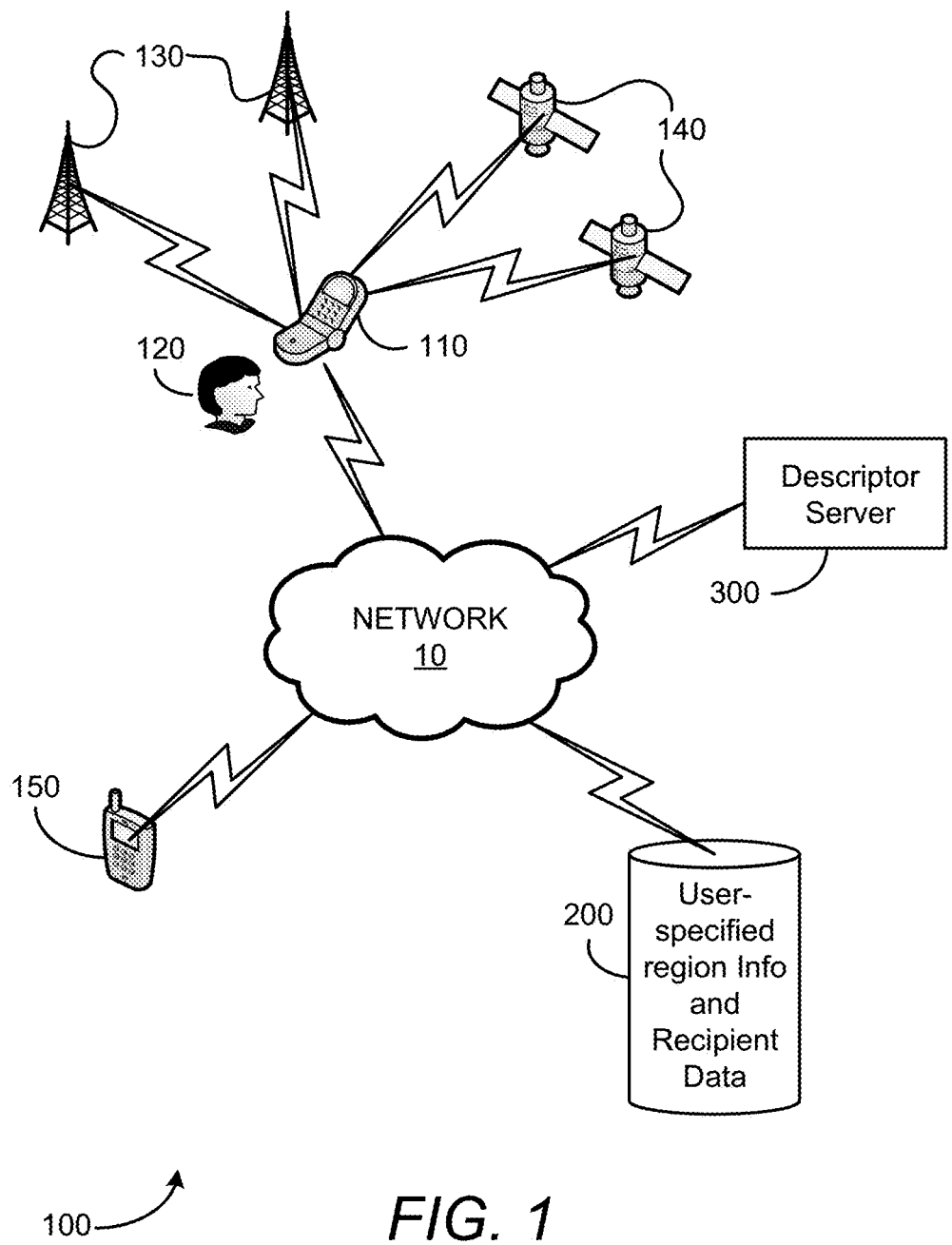
FIG. 1 is a block diagram illustrating an exemplary descriptor sharing system according to an exemplary embodiment.

FIG. 1 is a block diagram illustrating an exemplary descriptor sharing system 100 according to an exemplary embodiment. One or more network-enabled electronic communication devices 110, 150, such as a digital camera/phone, PDA, laptop or the like, are in communication with one another and with a descriptor server 300 over a network 10. A data store 200 includes user-specified region information and recipient data relating to a plurality of locations. The user-specific region information and the recipient data can be managed by the user, e.g., on his or her personal digital assistant (PDA), or can be managed for the user by another entity, such as via a remote data service. Typically, the user-specific region information and the recipient data is private information, but can include public or otherwise sharable information as well, such as information the user 120 chooses to share with others. The device 110 and the descriptor server 300 can access the data store 200 over the network 10.

Figure 2A:
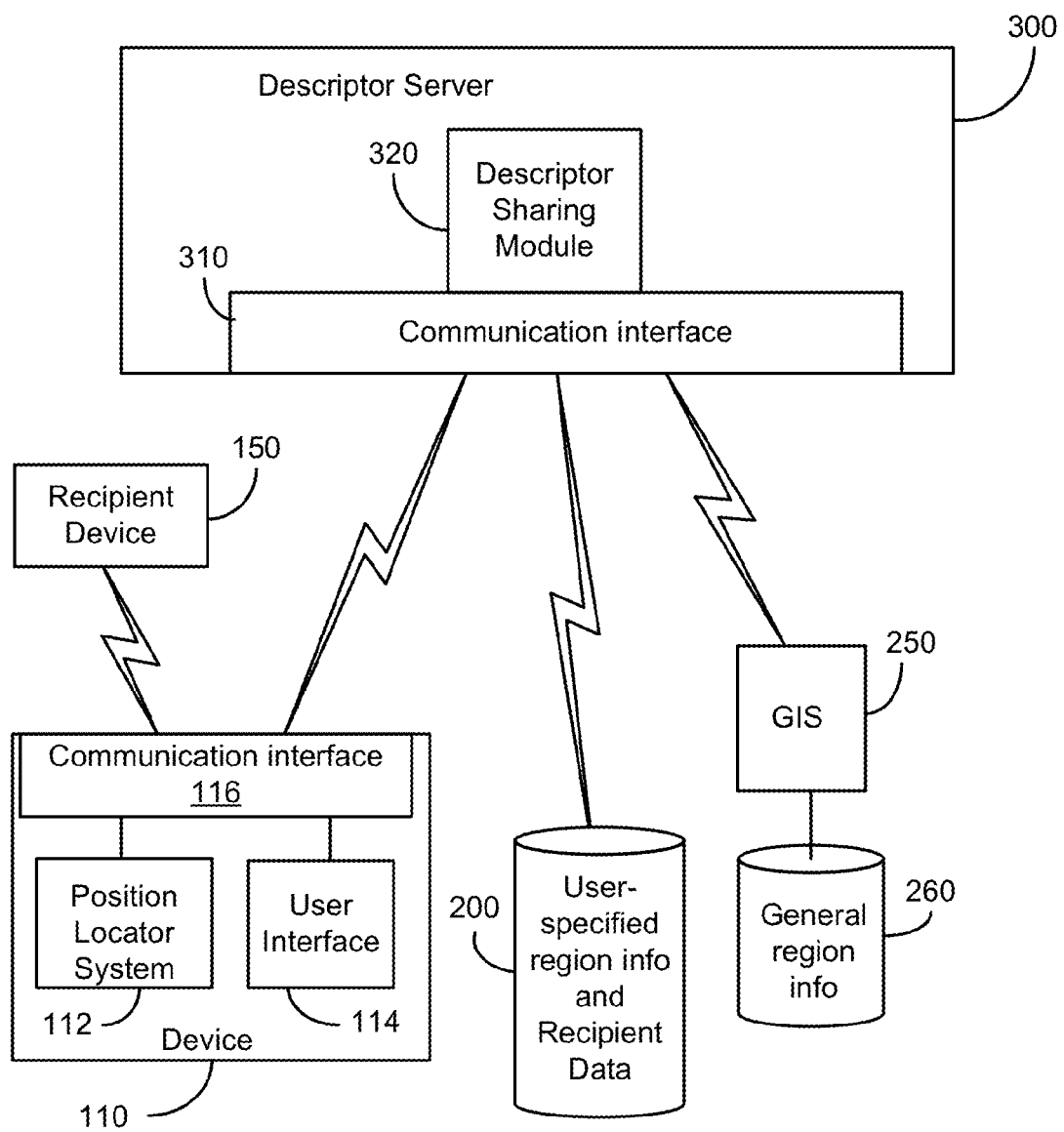
FIG. 2A-2C are detailed block diagrams illustrating exemplary descriptor sharing systems according to several embodiments.

FIG. 2A is a more detailed block diagram of the descriptor sharing system according to an exemplary embodiment. In one embodiment, the device 110 can be a mobile communication device that includes a means for tracking a position of the device 110. For example, the device 110 can include a position locator system 112 that tracks the position of the device 110. The position locator system 112 can be the well known global positioning system (GPS) that utilizes satellites 140 (FIG. 1) to determine the device's geospatial coordinates. Alternatively, the position locator system 112 can be configured to utilize one or more base stations 130 within communication range to determine the device's location. Each electronic communication device 110 includes means for communicating with the descriptor server 300. For example, the device 110 can include a communication interface 116 coupled to a user interface 114 that allows the user 120 to use the device 110 to communicate with the server 300 over a wireless network 10 using one or more communication protocols.

The descriptor server 300 can be a personal computer or other device capable of retrieving, transmitting, storing and analyzing data. The descriptor server 300 includes a communication interface 310 for communicating with the user's device 110, and for retrieving data from and writing data to the data store 200. In another embodiment, the descriptor server 300 can also communicate with a geographical information service (GIS) 250 in order to retrieve general region information 260 that is managed by or for an entity other than the user 120. The general region information 260 can include information related to the user 120 as well as for other users, but is not generally viewed as the user's data. The general region information is typically public information, but can include private information as well, e.g., information that is available through the use of pay services.

According to one exemplary embodiment, the descriptor server 300 can include a descriptor sharing module 320. In one embodiment, the descriptor sharing module 320 is configured to receive from the user's device 110 a request for a descriptor for a location and a recipient 150 to whom the descriptor is intended. In response to the request, the descriptor sharing module 320 is configured to select one or more descriptors associated with regions at or near the location based on the recipient's 150 level of familiarity with each region. The selected descriptors can be returned to the user's device 110 over the network 10 via the communication interface 310.

The system 100 illustrated in FIG. 1 and FIG. 2A is but one exemplary arrangement. In this arrangement, a "thin" mobile communication device 110 can be accommodated because the user-specified information can be stored remotely and the descriptor sharing module 320 can be included in a server 300. Other system arrangements can be designed by those skilled in the art. For example, in one embodiment, the data store 200 storing the user-specific region information and recipient data can be managed by the electronic communication device 110 internally. In this embodiment, the device 110 can identify the regions at or near the location and retrieve the data associated with the recipient, and push the user-specified items to the descriptor server 300. Alternatively, the descriptor sharing module 320 in the descriptor server 300 can pull from the communication device 110 the user-specified information it needs.

Figure 2B:
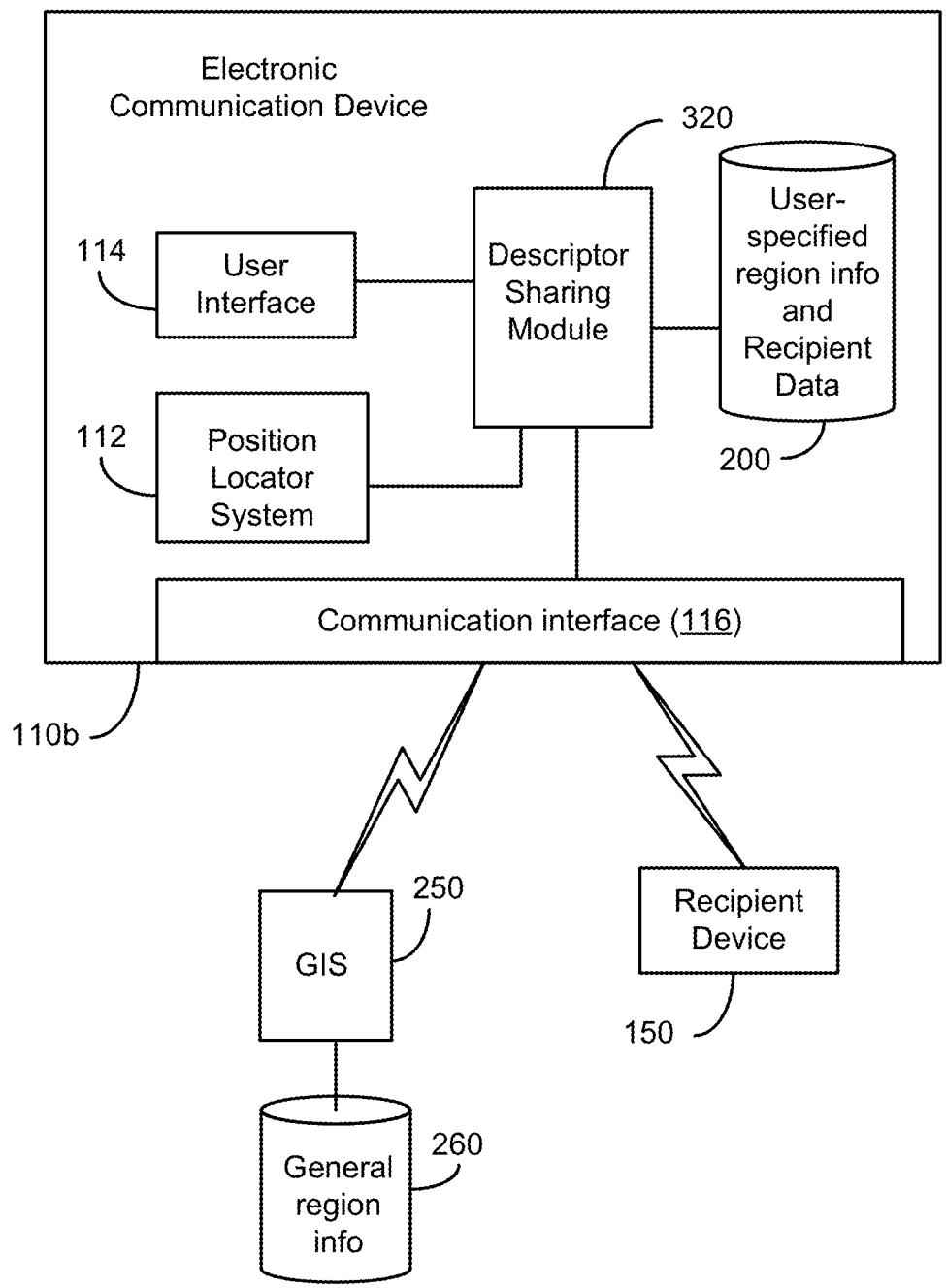

In another embodiment, shown in FIG. 2B, the electronic communication device 110b can include the descriptor sharing module 320 along with the data store 200 and the descriptor server 300 is not required. In this arrangement, the device 110b can securely manage the user-specified region information and recipient data for the user 120. Moreover, because fewer network connections are required to retrieve the user-specified information, the descriptor sharing module's performance can be improved.

Figure 2C:
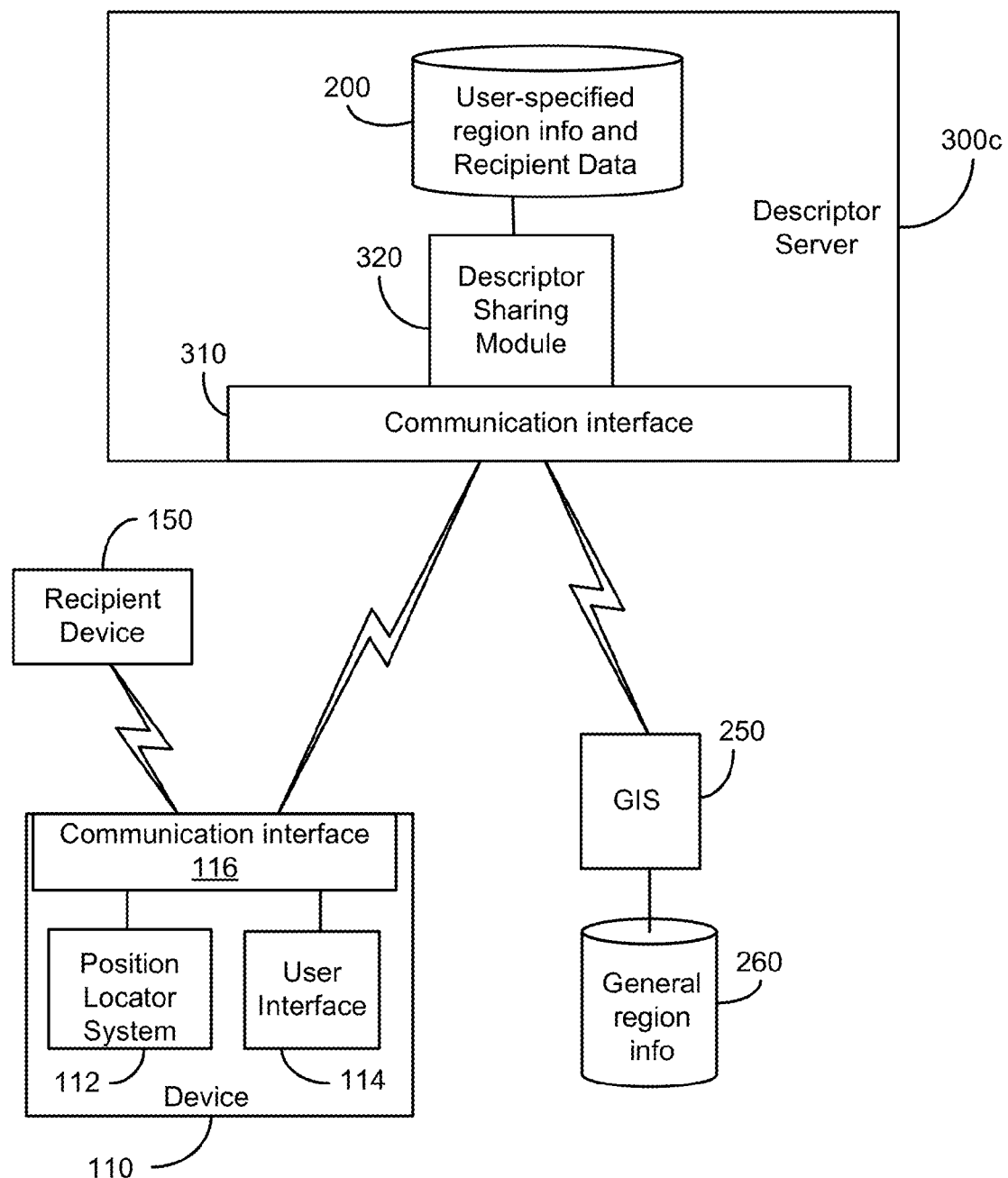

In another embodiment, shown in FIG. 2C, the descriptor server 300c can include the data store 200. In this embodiment, the descriptor sharing module 320 can securely manage the user-specified region information and recipient data for the user 120. Moreover, because fewer network connections would be required to retrieve the user-specified information, the descriptor sharing module's performance can be improved. Variations of these embodiments may be utilized and structural and functional modifications may be made without departing from the scope of the present disclosure.

Figure 3:
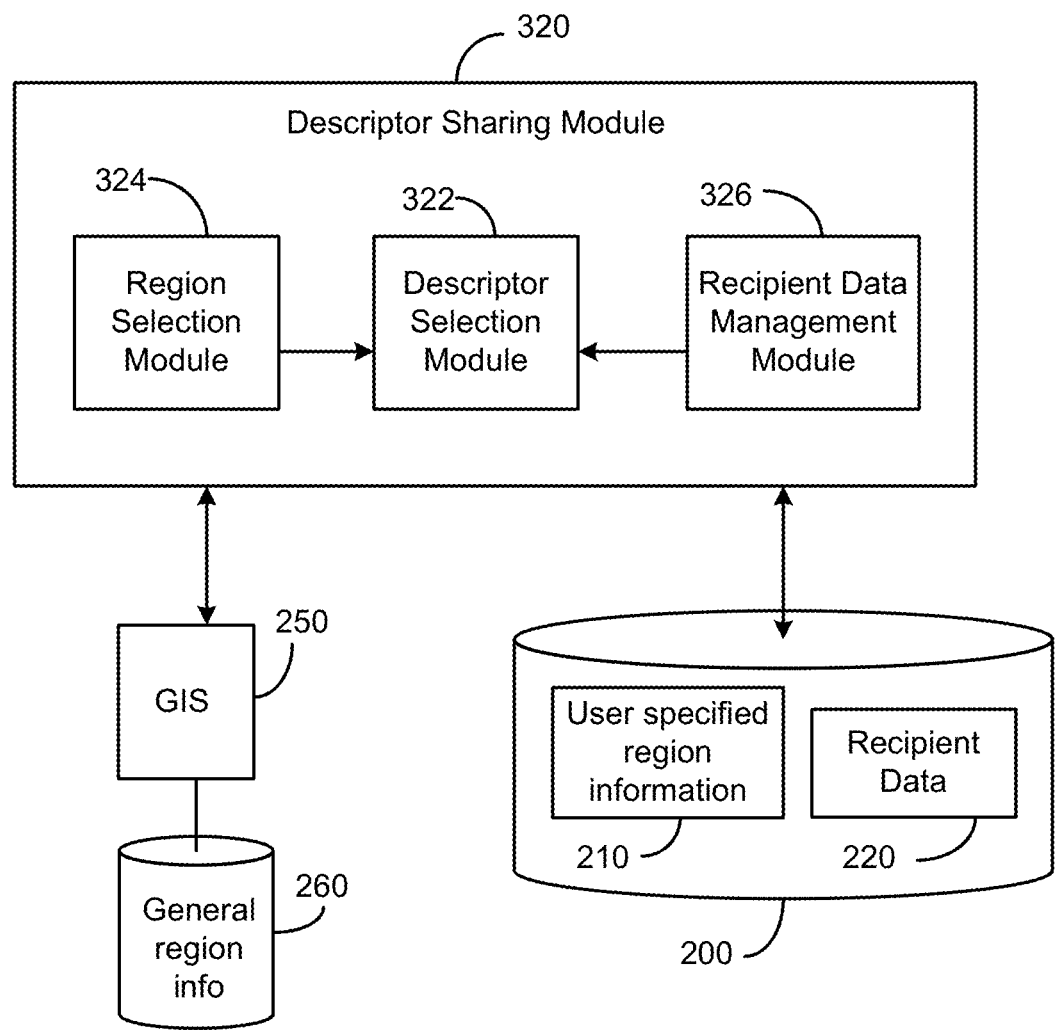
FIG. 3 a block diagram illustrating an exemplary descriptor sharing module according to an exemplary embodiment.

As stated above, the descriptor sharing module 320 is configured to select one or more regions that are at or near the location based on the recipient's level of familiarity with the selected regions in one embodiment. FIG. 3 is a block diagram illustrating an exemplary descriptor sharing module 320 in communication with the data source 200 according to one embodiment. As is shown, the descriptor sharing module 320 includes a descriptor selection module 222, a region selection module 324, and a recipient data management module 326. In one embodiment, the region selection module 324 is configured to retrieve, from the data store 200, user-specified region information 210 relating to a plurality of regions at or near the location based on the geospatial coordinates of the location. In another embodiment, the region selection module 324 is configured to retrieve, from the GIS 250, general region information 260 relating to a plurality of regions at or near the location based on the geospatial coordinates of the location.

In an exemplary embodiment, the user-specified region information 210 and general region information 260 includes at least one table that describes the user-defined and general attributes of a plurality of regions, including the descriptors. For example, the user-specified region information 210 and general region information 260 can include a region table that correlates a region identifier (region ID) with a set of origin geospatial coordinates and a boundary, shown in Table 1 below.

TABLE 1

| Region ID | Origin Longitude | Origin Latitude | Boundary |
| --- | --- | --- | --- |

The boundary field includes information that can be used to describe the region's boundary. Each region comprises an origin and/or size different from each of the other plurality of regions. A region can be of any shape or size, that is, a region can be as small as a particular position or point, referred to herein as a "positional region," and as large as a city, referred to herein as a "range region." Thus, the boundary field can include a radius or diameter when the region is circular in shape, or it can include street names that define the region. In one embodiment, the boundary field includes sufficient information to determine which geospatial coordinates are encompassed by the region.

TABLE 2

| Region ID | Descriptor |
| --- | --- |

In another embodiment, the user-specified region information 210 and general region information 260 also include a descriptor table, e.g., Table 2 above, that correlates the region ID with a descriptor. In one embodiment, the descriptor can be any character string that describes the region. For example, the descriptor can be a name of a building, a city name, a person's name that lives in the region, or a description of an event, e.g., "graduation ceremony."

TABLE 3

| Region ID | Descriptor | Access Rules |
| --- | --- | --- |

In another embodiment, the descriptor table in the user-specified region information 210 can include user-defined access rules. The user-defined access rules indicate which recipients 150 are permitted to receive the user-specified descriptor. The access rules can be associated with the region or with a region/descriptor pair if the region is associated with a plurality of descriptors. For example, if a region, e.g., a room, is restricted to employees of company XYZ, then the access rule associated with the region ID can define a permitted class, e.g., "XYZ employees," with which the associated descriptor can be shared. If the same region is associated with another descriptor, the access rule associated with the region/descriptor pair can define a different permitted class, e.g., "best friends," with which the associated descriptor can be shared. Thus, when the recipient 150 is a member of one, but not both, permitted class, the recipient 150 has permission to receive the descriptor corresponding to the permitted class.

Although the region information 210 has been described using two tables, more tables can be created to organize additional attributes associated with the regions. Alternatively, a single table could be created that includes a plurality of columns representing each attribute. Variations in storage schemas may be utilized without departing from the scope of the present disclosure.

Referring again to FIG. 3, the recipient data management module 326 is configured to retrieve, from the data store 200, recipient data 220 relating to the recipient. In one embodiment, the recipient data 220 includes at least one table that describes attributes associated with each of a plurality of prospective recipients 150. For example, the recipient data 220 can include a recipient table that correlates a recipient identifier (ID) with a recipient's name and an access privilege, as shown in Table 4 below.

TABLE 4

| Recipient ID | Recipient Name | Access Privilege |
| --- | --- | --- |

The recipient's access privilege indicates which descriptors the recipient is permitted to receive based on the user-defined access rules. In one embodiment, the access privilege defines at least one permitted class of which the recipient is a member. For example, if an access rule associated with a region restricts the descriptor to be shared with "XYZ employees," the recipient is permitted to receive the descriptor when the recipient's access privilege indicates that the recipient is an XYZ employee, i.e., a member of the permitted class of "XYZ employees."

TABLE 5

| Recipient ID | Region ID | Direct Count |
| --- | --- | --- |

In addition to the recipient table described above, the recipient data 220 can also include a recipient familiarity table, shown above, that correlates a recipient ID and a region ID with a direct count. In one embodiment, the direct count indicates how many times the recipient 150 has been known by the user's device 110 to act or interact in relation to the region. For example, when the user's communication device 110 shares or receives a descriptor for a region with or from the recipient 150, the direct count corresponding to the recipient and the region is incremented. In one embodiment, the recipient data management module 326 is configured to monitor the user's communication device 110 to determine which recipients have received or shared descriptors from or with the user's communication device 110, and to increment the corresponding direct count. As will be described below, the recipient's level of familiarity with a region is based on the region's direct count.

In one embodiment, the region information 210, 260 relating to regions near or including the location and the recipient data 220 relating to the recipient 150 are received by the descriptor selection module 322. The descriptor selection module 322 is configured to analyze the region information 210, 260 and the recipient data 220 and to generate a ranked list of potential descriptors for the location based on factors including the recipient's familiarity with each of the regions near or including the location. In one embodiment, the descriptor selection module 322 is configured to select and send the highest ranked descriptor to the user's communication device 110. In another embodiment, the description selection module 322 can send a predetermined number of highest ranked descriptors so that the user 120 can select which descriptor to share.

Figure 4:
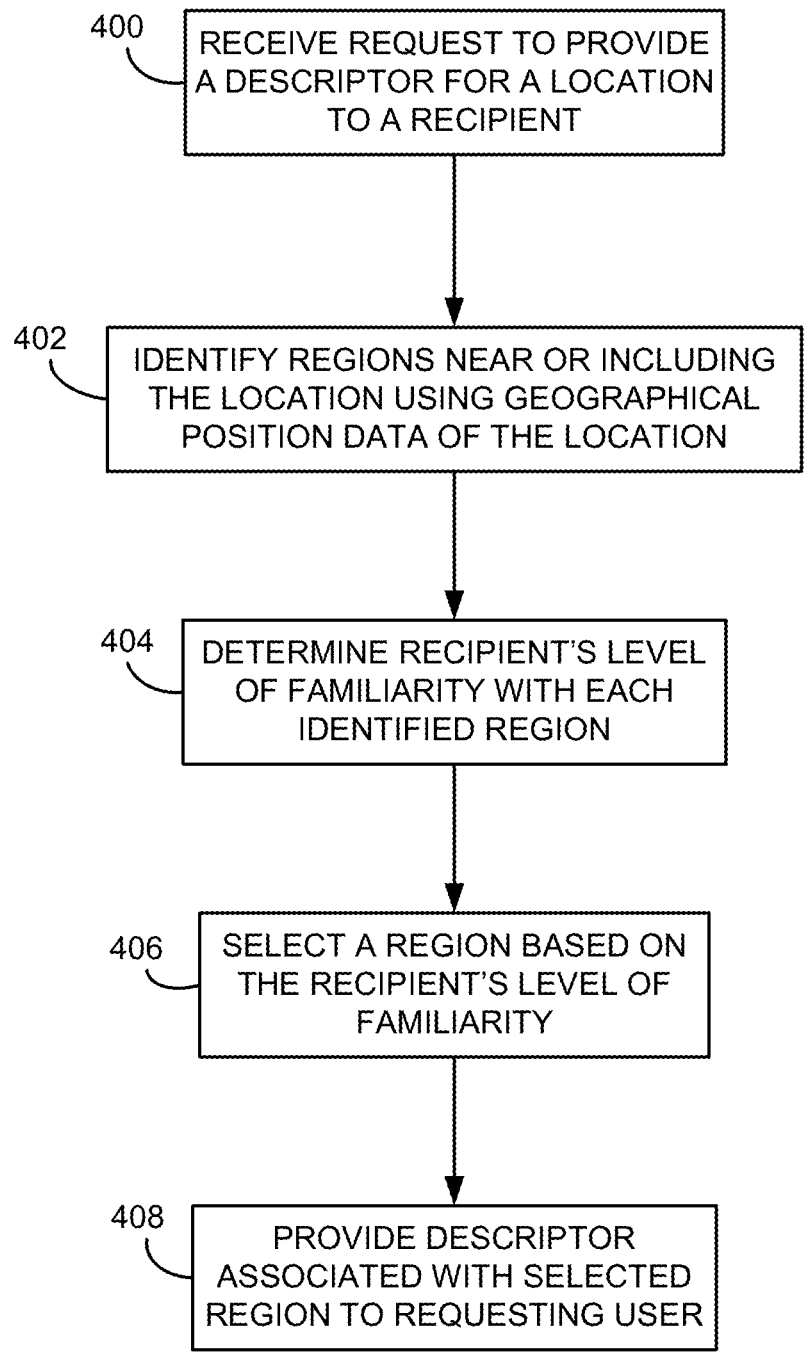
FIG. 4 is a flow diagram illustrating an exemplary process for sharing a descriptor for a location according to an exemplary embodiment.

FIG. 4 is a flow diagram illustrating an exemplary process for providing a descriptor for a location to a recipient according to one embodiment. Referring to FIG. 1, FIGS. 2A-2C, FIG. 3 and FIG. 4, the exemplary process begins when the descriptor sharing module 320 receives a request from an electronic communication device 110 associated with a user 120 to provide a descriptor for a location to a recipient 150 (block 400). In one embodiment, the request includes geographical position data corresponding to the location. The geographical position data can comprise geospatial coordinates generated by the position locator system 112 in the device 110 or provided by the user 120 via the user interface 114. In addition, the request includes the recipient's name or the recipient ID corresponding to the recipient 150.

In one embodiment, the user 120 can control the precision of the descriptors. For instance, the user 120 can specify in the request a distance threshold. Here, a potential region will be considered when the distance between the location and a center of the potential region is less than the distance threshold. For example, if the distance threshold is set at one hundred kilometers, only regions within one hundred kilometers of the location will be considered. In another embodiment, an area threshold can also be specified. In this case, only regions that encompass the location and that have an area less than the area threshold are considered. In another embodiment, the descriptor sharing module 320 can set and/or adjust the distance and/or area thresholds based on the region information 210, 260. For example, if the location is in a remote area and no region satisfies the distance and/or area thresholds, the sharing module 320 can increase/expand the thresholds accordingly. On the other hand, if the location is in dense area, the sharing module 320 can decrease/reduce the thresholds accordingly.

Once the descriptor sharing module 320 receives the user's request, the region selection module 324 uses the geographical position data and the distance/area thresholds to identify regions near or including the location (block 402). In one embodiment, the region selection module 324 is configured to retrieve region information from the data source 200 and optionally from the GIS 250. In particular, the region selection module 324 can retrieve data from the region tables (see Table 1) to determine if a region encompasses the location, to determine the area of a region, and to determine the distance between the center of a region and the location. For example, suppose a region is represented by a circle having radius r and its center located at geospatial coordinates (x, y), and the location is located at geospatial coordinates (a, b). The region encompasses the location if the distance between the center of the region and the location is less than the radius of the region, i.e., distance ((x, y), (a, b))<r. The area of the region is simply the area of the circle, i.e., $(\pi)(r)^2$.

The distance between two points, e.g., (x, y) and (a, b), can be defined using a number of well known techniques.

For example, in one embodiment, the distance can be a "practical" distance, i.e., the distance of the shortest path (or shortest driving path or shortest walking path) between the two points. The "practical distance" can be obtained from an external mapping and routing service (not shown). In another embodiment, the distance can be a "Euclidean distance", that is, the distance is the $SQRT((x-y)^2+(a-b)^2)$. While this measure neglects the curvature of the planet, it can be appropriate when the points under consideration are within a relatively short distance of each other. In another embodiment, the distance can be a "Manhattan distance," that is, the distance is $ABS(x-y)+ABS(a-b)$. Other distance measuring techniques, including those that account for the curvature of the earth, can be used that are well known to those skilled in the art.

In one embodiment, once the regions near or including the location are identified, the region selection module 324 can retrieve from the data store 200 and optionally from the GIS 250 the user-specified region information 210 and general region information 260 associated with the identified regions near or including the location. In one embodiment, the region selection module 324 can retrieve data from the descriptor table (see Tables 2 and 3) and from the region table (Table 1) corresponding to the identified regions. The region information 210, 260 for an identified region can include the region ID, the region descriptor, the geospatial coordinates of the region's center, the boundary information and, in the case of the user-specified region information 210, the access rules. This region information 210, 260 is passed to the descriptor selection module 322.

In an exemplary embodiment, the descriptor selection module 322 receives the region information 210, 260 and determines the recipient's level of familiarity with each identified region near or including the location (block 404). In one embodiment, the descriptor selection module 322 can pass region identifiers for the identified regions to the recipient data management module 326, which uses the recipient's name or identifier (provided in the request) to retrieve recipient data 220 associated with the recipient 150 and with each identified region. In one embodiment, the returned recipient data 220 can comprise the information in the recipient familiarity table (Table 5) described above, which includes the direct count for a region and the recipient.

As stated above, the direct count indicates how many times the recipient 150 has been known by the user's device 110 to act or interact in relation to the region. In one embodiment, the recipient data management module 326 can monitor the user's communication device 110 to determine the number of times the recipient has acted or interacted in relation to the region. In this embodiment, a region can be associated with one descriptor. In another embodiment, a region can be associated with a plurality of descriptors forming a plurality of region/descriptor pairs. In this embodiment, the recipient data management module 326 can determine the number of times the recipient acts or interacts in relation to each descriptor associated with a particular region/descriptor pair.

In one embodiment, the recipient data management module 326 can count the number of times a recipient has received or shared a descriptor from or with the user's communication device 110. In another embodiment, the recipient data management module 326 can monitor planned events or activities that include the recipient and a region. For example, an entry in the user's calendar can include a descriptor for a region and the recipient's name or identifier. When an interaction of the recipient 150 in relation to the region is detected, the recipient data management module 326 is configured to increment the direct count corresponding to the recipient and the region or the region/descriptor pair if the region is associated with several descriptors.

In one embodiment, the recipient's level of familiarity with the identified region is proportional to the direct count corresponding to the identified region. In one embodiment, the level of familiarity can be based solely on the direct count of the identified region. In another embodiment, the level of familiarity can be based on an "effective" count for the identified region. In this embodiment, if the identified region is a positional region, i.e., a particular position or point, then the effective count is the direct count. If the identified region is a range region, however, the effective count is the sum of the direct count of the identified region and the direct count of any positional or range regions that are encompassed by the identified region.

Similarly, in the embodiment where the region is associated with several descriptors, the recipient's level of familiarity with the region/descriptor pair is proportional to the direct count corresponding to the region/descriptor pair. In one embodiment, the level of familiarity can be based solely on the direct count or can be based on an "effective" count for the identified region/descriptor pair.

In one embodiment, the descriptor selection module 322 can quantify the familiarity level for each identified region based on the corresponding direct or effective count. For example, the familiarity level can be set to "low," if the direct or effective count is between zero (0) and one (1); "medium" if the direct or effective count is between two (2) and five (5); and "high" if the direct or effective count is greater than six (6). The thresholds are for exemplary purposes and can vary, e.g., according to the user's preferences. Once the descriptor selection module 322 has determined the recipient's level of familiarity with each identified region (block 404), the descriptor selection module 322 can select a region based on the recipient's level of familiarity with the selected region (block 406).

Figure 5:
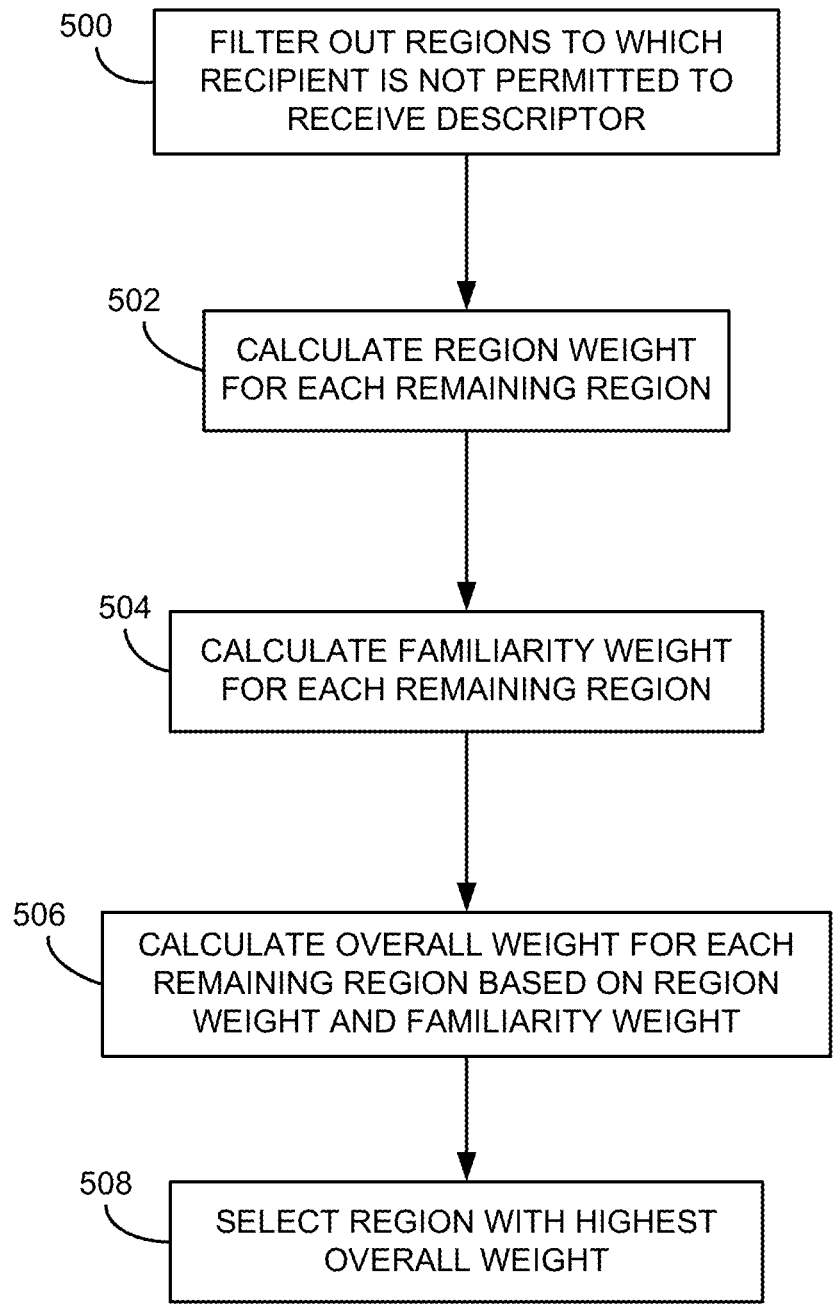
FIG. 5 is a flow diagram illustrating an exemplary process for selecting a region based on the recipient's familiarity with a region according to an exemplary embodiment.

FIG. 5 is a flowchart illustrating an exemplary process for selecting a familiar region according to one embodiment. The descriptor selection module 322 begins the exemplary selection process by filtering out regions to which the recipient is not permitted to receive the corresponding descriptors (block 500). As stated above, the user-specified region information 210 includes user-defined access rules associated with each region or region/descriptor pair (if the region is associated with more than one descriptor). In this embodiment, the descriptor selection module 322 can invoke the recipient data management module 326 to retrieve information from the recipient table (e.g., Table 4) corresponding to the recipient 150. The retrieved information can include the recipient's access privilege. In one embodiment, the descriptor selection module 322 compares the recipient's access privilege to the access rules associated with each identified region or region/descriptor pair. If the recipient is not a member of a particular permitted class defined by an access rule, then the region associated with the access rule is eliminated from consideration.

In one embodiment, filtering out regions to which the recipient is not permitted to receive the corresponding descriptors can be performed prior to determining the recipient's level of familiarity with each region (block 404). By filtering at an earlier stage of the process, the number of identified regions can be reduced quickly and easily, thereby improving efficiency and reducing costs because fewer regions are processed thereafter.

After the identified regions have been filtered, the descriptor selection module can calculate a region weight for each of the remaining identified regions (block 502). In one embodiment, the region weight for each region is based on the region's size and proximity to the location. For example, for a region having an area M, the region weight can be inversely proportional to (1+M) when the region encompasses the location, or inversely proportional to the product of $(1+M) \times (1+L^2)$ when the region does not encompass the location and where L is the distance between the location and the region. In another embodiment, the region weight can be based on other factors such as the number of points of interest within the region or the number of addresses or people residing in the region.

In one embodiment, the descriptor selection module 322 can then calculate a familiarity weight for each of the remaining identified regions (block 504). In one embodiment, the familiarity weight for each region is based on the recipient's level of familiarity with the region and on the nature of the region. For example, if the region is a positional region, the familiarity weight can be: zero (0) when the recipient's level of familiarity is "low"; 0.1 when the recipient's level of familiarity is "medium"; 1.0 when the recipient's level of familiarity is "high." If the region is a range region, the familiarity weight can be: zero (0) when the recipient's level of familiarity is "low"; 1.0 when the recipient's level of familiarity is "medium"; 10.0 when the recipient's level of familiarity is "high."

After the region weight and the familiarity weight have been calculated, the descriptor selection module 322 can calculate an overall weight for each remaining region based on the region weight and the familiarity weight (block 506). In one embodiment, the overall weight is the product of the region weight and the familiarity weight. Once the overall weight of each remaining region is calculated, the descriptor selection module 322 can select a region with the highest overall weight (block 508).

Referring again to FIG. 4, once the region is selected, the descriptor selection module 322 can identify the descriptor associated with the selected region and provide the descriptor to the requesting user 120 (block 408) so that the user 120 can share the descriptor with the recipient 150 via the electronic communication device 110. In one embodiment, before providing the descriptor to the user 120, the descriptor selection module 322 can modify the associated descriptor to indicate a relationship between the selected region and the location. For example, if the selected region encompasses the location, the descriptor can be modified by adding a phrase, such as "in" or "within," before the descriptor. Similarly, if the selected region does not encompass the location, the descriptor can be modified by adding a phrase, such as "near" or "close to," before the descriptor.

According to the exemplary embodiment described above, the descriptor selection module 322 is configured to select the region based on the region weight and the recipient's familiarity with the region. In other embodiments, the descriptor selection module 322 can consider additional factors. For instance, in one embodiment, the region can be selected based on the user's propensity to select descriptors based on the region, along with the region weight and the recipient's familiarity with the region. In this embodiment, a priority weight can be assigned to each region. The priority weight can be based on how often the user 120 accepts descriptors based on the region when the region is selected by the descriptor selector module 322. If the user 120 accepts descriptors based on the region, then the priority weight for the given region increases. If the user 120 does not accept the descriptors based on the region, then the priority weight for the given region decreases. The priority weight for each region can be adjusted over time to reflect the user's preferences and can be stored in the user-specified region information 210. In one embodiment, the overall weight for the region can be the product of its priority weight, its region weight and the familiarity weight.

In another embodiment, the region can be selected based on an expected action of either the user 120 or the recipient 150 at the location. In this embodiment, an action can be associated with the descriptor for a region. For example, the descriptor "movie theater" can be associated with the actions "watch movie" and "entertainment", and the descriptor "shopping center" can be associated with the actions "buy clothes", "buy shoes", "buy home improvement goods" or "eat out". Each action associated with the descriptor is compared to the expected action of either the recipient 150 or the user 120. In one embodiment, the region is selected based on a correlation between the expected action of either the recipient 150 or the user 120 and the action associated with the descriptor for the selected region.

The executable instructions of a computer program for practicing the methods illustrated in FIG. 4 and FIG. 5 can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used here, a "computer readable medium" can be any means that can contain or store the program for use by or in connection with the instruction execution system, apparatus, or device. The computer readable medium can be, for example, but is not limited to, one or more of any suitable media for storing the executable instructions of a computer program in one or more of an electronic, magnetic, optical, and electromagnetic form such that the instruction execution system, apparatus, or device can read (or fetch) the instructions from the computer readable medium and execute the instructions for carrying out the described methods.

More specific examples (a non-exhaustive list) of the computer readable medium can include the following: a portable computer diskette, a random access memory (RAM), a read only memory (ROM), an erasable programmable read only memory (EPROM or Flash memory), optical storage devices including a portable compact disc (CD), a portable digital video disc (DVD), and the like.

Figure 6:
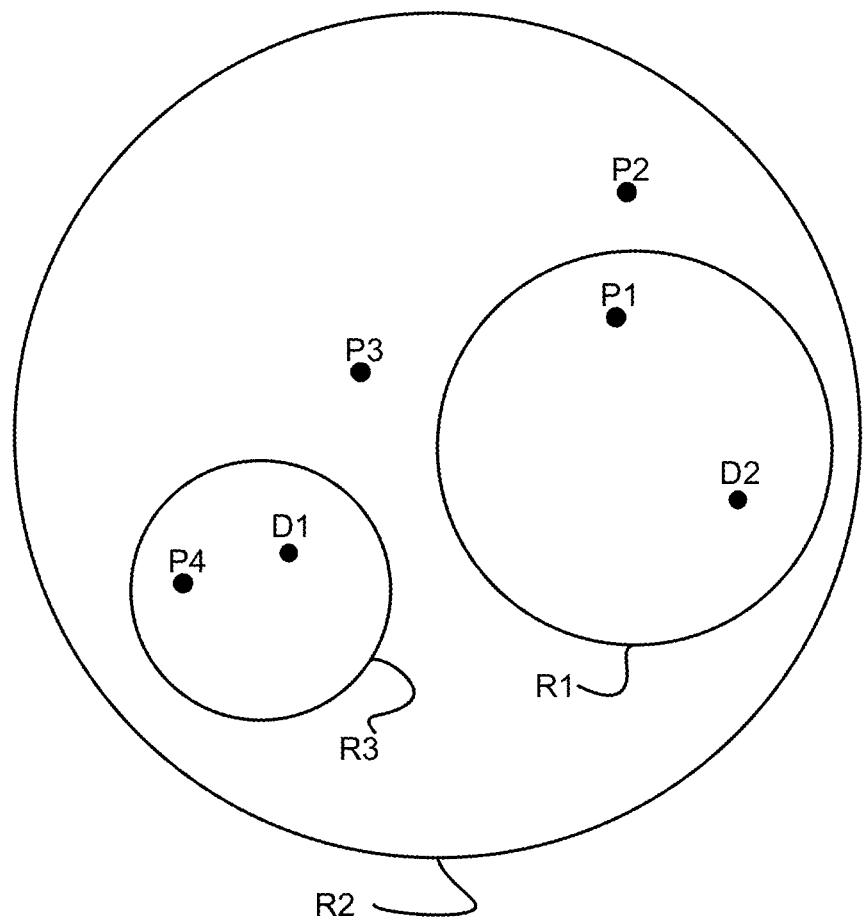
FIG. 6 depicts a map of regions according to one embodiment.

The following example illustrates an exemplary method of selecting and providing a descriptor for a location according to one embodiment. In this example, a user 120, Steve, would like to share a descriptor about a location D1 with two potential recipients, Mintz and Ryan. In particular, Steve would like to convey some information to Mintz and Ryan that Steve is at "PANERA" located at D1. FIG. 6 illustrates an exemplary map of the general area concerned. As is shown, several positional and range regions are depicted. Positional regions are denoted with P, while range regions are denoted with R.

For each region, user-specified region information 210 and/or general region information 260 is available. For example, exemplary descriptor tables in the user-specific region information 210 and general region information 260 follow:

| General Descriptor Table ||
| Region ID | Descriptor |
| --- | --- |
| gP1 | 111 Corning Road |
| gP2 | Movies |
| gP3 | HOME DEPOT |
| gP4 | KOHL'S |
| gD1 | PANERA |
| gR1 | Crossroads 3 Property |
| gR2 | Crossroads Area |
| gR3 | BJ's area |

| User-Specified Descriptor Table |||
| Region ID | Descriptor | Access Rules |
| --- | --- | --- |
| uD1 | PANERA near office | * |
| uD2 | Conference room | IPAC |
| uR3 | BJ'S and KOHL'S shopping center | * |

The access rule "*" matches all access privileges.

The following information can be calculated from the user-specified region information 210 and general region information 260 (in suitable units such as miles or kilometers):

| Region ID | Area of the Region | Distance of Region from D1 |
| --- | --- | --- |
| P1 | 0 | 3.3 |
| P2 | 0 | 4.0 |
| P3 | 0 | 2.5 |
| P4 | 0 | 1.5 |
| P6 | 0 | 4.0 |
| D2 | 0 | 4.0 |
| R1 | 5.0 | 3.3 |
| R2 | 49.0 | 2.5 |
| R3 | 7.5 | 0.5 |

An exemplary recipient table and exemplary recipient familiarity table in the recipient data 220 are provided below:

| Recipient Table |||
| Recipient ID | Recipient Name | Access Privilege |
| --- | --- | --- |
| Ryan-2 | Ryan F | IPAC |
| Mintz-3 | S. Mintz | Guest |

| Familiarity Table |||
| Recipient ID | Region ID | Direct Count |
| --- | --- | --- |
| Ryan | uD2 | 10 |
| Ryan | gP1 | 2 |
| Ryan | gP3 | 2 |
| Ryan | gR1 | 2 |
| Ryan | gR2 | 2 |
| Ryan | uR3 | 2 |
| Mintz | gR3 | 2 |
| Mintz | gP3 | 2 |

In this example, Steve transmits a request to provide a descriptor for location D1 to Mintz and Ryan. The request is received by the descriptor sharing module 320 and the region selection module 324 identifies the positional and range regions shown in FIG. 6. The following tables illustrate the results of the selection process as applied on the above data for providing a descriptor pertaining to a region D1 with Mintz and Ryan.

| Mintz ||||||
| Region | Region Weight | Recipient's familiarity | Filter | Familiarity Weight | Overall Weight |
| --- | --- | --- | --- | --- | --- |
| uD2 | 1/17 | | X (not allowed) | 0 | 0 |
| uR3 | 1/8.5 | | OK (allowed) | 0 | 0 |
| gP1 | 1/12 | | Not filtered | 0 | 0 |
| gP2 | 1/17 | | Not filtered | 0 | 0 |
| gP3 | 1/7 | Medium | Not filtered | 0.1 | 1/70 |
| gP4 | 1/3 | | Not filtered | 0 | 0 |
| gR1 | 1/72 | | Not filtered | 0 | 0 |
| gR2 | 1/50 | | Not filtered | 0 | 0 |
| gR3 | 1/8.5 | Medium | Not filtered | 1 | 1/8.5 |

| Ryan ||||||
| Region | Region Weight | Recipient's familiarity | Filter | Familiarity Weight | Overall Weight |
| --- | --- | --- | --- | --- | --- |
| uD2 | 1/17 | High | OK | 1 | 1/17 |
| uR3 | 1/8.5 | Medium | OK | 1 | 1/8.5 |
| gP1 | 1/12 | Medium | Not filtered | 1/10 | 1/120 |
| gP2 | 1/17 | | Not filtered | 0 | 0 |
| gP3 | 1/7 | Medium | Not filtered | 1/10 | 1/70 |
| gP4 | 1/3 | Medium | Not filtered | 1/10 | 1/30 |
| gR1 | 1/72 | Medium | Not filtered | 1 | 1/72 |
| gR2 | 1/50 | Medium | Not filtered | 1 | 1/50 |
| gR3 | 1/8.5 | | Not filtered | 0 | 0 |

As shown in the above table, Mintz can receive a descriptor based on region gR3 (i.e., "BJ'S area") and Ryan can be given a descriptor based on region uR3 (i.e., "BJ'S and KOHL'S shopping center"). The descriptor can be combined with any other descriptor that the user, Steve, might have for the region D1. For example, Steve may tell Mintz something to the effect that "I am at PANERA in BJ'S area" and may tell Ryan something to the effect that "I am at PANERA near the "BJ'S and KOHL'S shopping center". In these examples, the underlined text corresponds to a descriptor that is based on a region that has an origin or size different from the region D1. Each region is selected based on the recipient's familiarity with the region and on the user's relationship with the recipient.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method of providing a descriptor of a location to a recipient, the method comprising:
   receiving location data for a location of a user of an associated communication device;
   identifying one or more regions near or including the location using the location data, wherein each region is associated with a descriptor;
   selecting one of the one or more regions based on a recipient's interaction with the selected region including whether the user has shared with or received from the recipient the descriptor associated with the selected region; and
   providing the descriptor associated with the selected region to the recipient, wherein at least one of the preceding actions is performed on at least one electronic hardware component.

2. The method of claim 1 wherein identifying the one or more regions near or including the location includes identifying regions near or including the region that are within a distance threshold.

3. The method of claim 1 wherein identifying the one or more regions near or including the location includes identifying regions near or including the region that are within an area threshold.

4. The method of claim 1 further comprising:
   for the selected region, determining whether the recipient has permission to receive the descriptor associated with the selected region prior to providing the descriptor to the recipient.

5. The method of claim 4 wherein at least one of the one or more regions is associated with a plurality of descriptors forming a plurality of region/descriptor pairs and determining whether the recipient has permission to receive the descriptor associated with the selected region includes:
   identifying a permitted class associated with each region/descriptor pair; and
   granting the recipient permission to receive the descriptor of a region/descriptor pair associated with a particular permitted class when the recipient is a member of the particular permitted class.

6. The method of claim 1 wherein indicating the recipient's interaction with one of the one or more regions includes counting a number of times the user has shared with or received from the recipient the descriptor associated with the region, wherein the descriptor is directly associated with the region or is associated with another region within the region, and wherein the recipient's interaction with the region is proportional to the number of times the user has shared with or received from the recipient the descriptor associated with the region.

7. The method of claim 1 further comprising:
   associating each descriptor for a region with an action; and
   comparing the action with an expected action of at least one of the user and the recipient at the location, wherein selecting the region is further based on a correlation between at least one of the user's and the recipient's expected actions at the location and the action associated with the descriptor for the selected region.

8. The method of claim 1 further comprising providing geographical position data of the location without regard to a current location of the user.

9. The method of claim 1 further comprising providing a relationship between the selected region and the location in association with each descriptor.

10. The method of claim 1 wherein indicating the recipient's interaction with a region includes indicating the recipients presence in the region.

11. A system for providing a descriptor of a location to a recipient, the system comprising system components including:
    a data store for storing region information correlated with location data, wherein the region information includes a user-specified descriptor associated with each of a plurality of regions, and for storing recipient data relating to the region information; and
    a descriptor sharing module coupled to the data store, the descriptor sharing module configured to receive location data for a location of a user of an associated communication device, to use the location data of the location to identify one or more regions near or including the location based on the region information, select one of the one or more regions based on a recipient's interaction with the selected region including whether the user has shared with or received from the recipient the descriptor associated with the selected region, and to provide the descriptor associated with the selected region to the recipient, wherein at least one of the system components includes at least one electronic hardware component.

12. The system of claim 11 wherein identifying the one or more regions near or including the location includes identifying regions near or including the region that are within a distance threshold.

13. The system of claim 11 wherein identifying the one or more regions near or including the location includes identifying regions near or including the region that are within an area threshold.

14. The system of claim 11 wherein the region information includes user-defined access rules associated with each of the plurality of regions and wherein the descriptor sharing module is configured to determine whether the recipient has permission to receive the descriptor associated with a region based on the access rules.

15. The system of claim 11 wherein the descriptor sharing module is configured to indicate the recipient's interaction with the region by determining a number of times the user has shared with or received from the recipient the descriptor associated with the region, wherein the descriptor is directly associated with the region or is associated with another region within the region, and wherein the recipient's interaction with the region is proportional to the number of times the user has shared with or received from the recipient the descriptor associated with the region.

16. The system of claim 11 wherein a descriptor for a region is further associated with an action and wherein the descriptor sharing module is further configured to compare the action associated with the descriptor with an expected action of at least one of the user and the recipient at the location and to select the region based on a correlation between at least one of the user's and the recipient's expected actions at the location and the action associated with the descriptor for the selected at least one region.

17. The system of claim 11 wherein the descriptor sharing module is configured to provide a relationship between the selected region and the location in association with each descriptor.

18. The system of claim 11 wherein indicating the recipient's interaction with a region includes indicating the recipients presence in the region.

19. A non-transitory computer readable medium containing programming instructions for providing a descriptor of a location to a recipient, the program instructions for performing a method comprising:
- receiving location data for a location of a user of an associated communication device;
- identifying one or more regions near or including the location using the location data, wherein each region is associated with a descriptor;
- selecting one of the one or more regions based on a recipient's interaction with the selected region including whether the user has shared with or received from the recipient the descriptor associated with the selected region; and
- providing the descriptor associated with the selected region to the recipient.

* * * * *